L. Scharff,
Water Filter,

No. 51,485.  Patented Dec. 12, 1865.

Witnesses:
Charles Howson.
Wm. Albert Steel.

Inventor:
Louis Scharff
By his Attorney.
H. Howson.

UNITED STATES PATENT OFFICE.

LOUIS SCHARFF, OF SPRING MILL, PENNSYLVANIA.

IMPROVEMENT IN COMBINED FILTER AND COOLER.

Specification forming part of Letters Patent No. 51,485, dated December 12, 1865.

*To all whom it may concern:*

Be it known that I, LOUIS SCHARFF, of Spring Mill, Montgomery county, Pennsylvania, have invented a Combined Water Filter and Cistern; and I do hereby declare the following to be a full, clear, and exact description of the same, reference being had to the accompanying drawings, and to the letters of reference marked thereon.

My invention consists in a combined filter and cistern composed of two vessels, one of which contains a perforated partition and a filtering material, both vessels being buried in the earth and combined with each other, and with inlet and outlet pipes, as described hereinafter, so that the water admitted to the vessels may be both purified and cooled, and so that the sediment collected in the apparatus may be readily removed without the necessity of opening or removing either of the vessels.

In order to enable other to make and use my invention, I will now proceed to describe its construction and operation.

Figure 1:
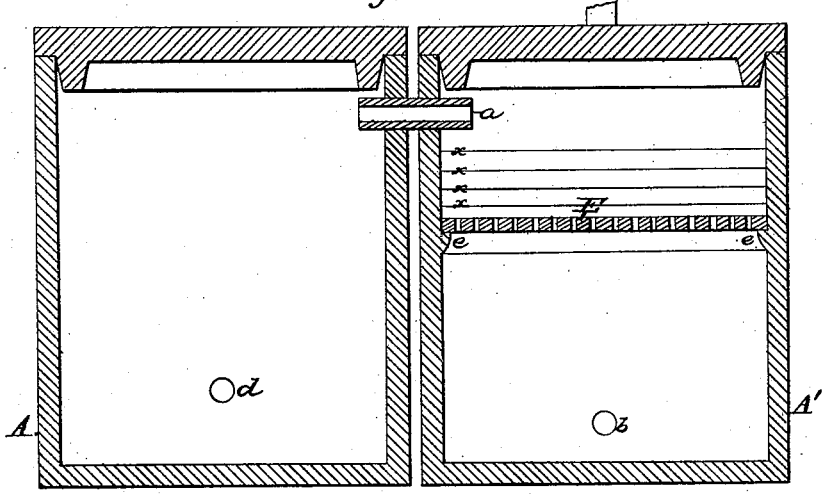
Figure 2:
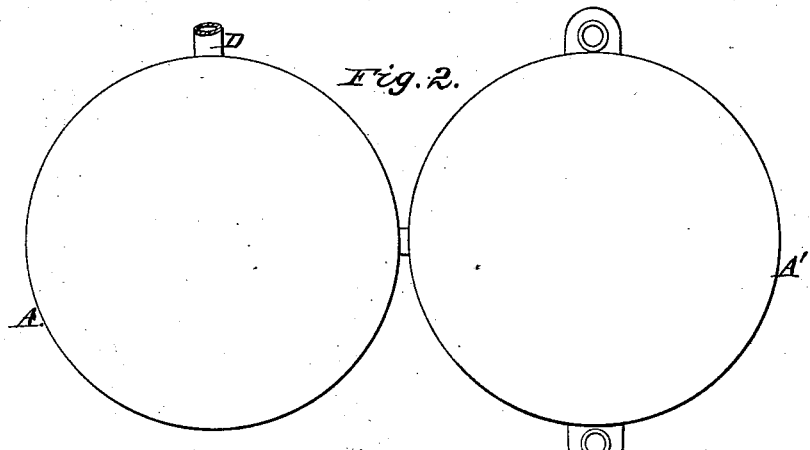
Figure 3:
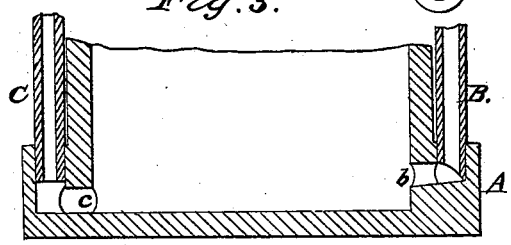

On reference to the accompanying drawings, which form a part of this specification, Figure 1 is a sectional elevation of my combined water filter and cistern; Fig. 2, a plan view, and Fig. 3, a detached sectional view.

Similar letters refer to similar parts throughout the several views.

A and A' are two cylindrical earthenware vessels or reservoirs, which are closed at the top, and communicate with each other through a pipe, $a$.

At one side of the vessel A', a short distance above the bottom of the same, is an opening, $b$, for the introduction of the end of the inlet-pipe B, and in the side of the vessel A is an opening, $d$, with which communicates the outlet-pipe D. On a level with the bottom of the vessel A' is an opening, $c$, communicating with a pipe, C, for a purpose described hereinafter.

About midway between the top and bottom of the vessel A' is a ledge, $e$, on which rests a perforated partition, E, and on the latter are deposited alternate layers, $x$, of sand and charcoal, or any other suitable filtering material.

The vessels A and A' are buried in the earth at such a depth as may be necessary to keep the water in the same cool, the pipes C and D extending above the surface, and being provided with suitable cocks for regulating the flow of water from the vessels. After the water enters the vessel A' through the pipe B, it passes upward through the perforated plate E and through the filtering material, by which it is purified, and thence through the pipe $a$ into the vessel A, from which it may at any time be drawn through the pipe $d$. While the water remains in the vessel A', below the partition E, the heavier particles of matter in the same are precipitated onto the bottom of the vessel, and it will be seen that the opening $b$ is at such a height above the bottom that the layer of sediment on the latter will not be disturbed by the influx of water through the opening.

The sediment may be readily removed from the bottom of the vessel A' at any time by turning the cock connected to the pipe C so that the water may flow from the latter, the current of water from the opening $b$ to the opening $c$ being sufficiently strong to carry the sediment with it into the latter opening, and thence into and out of the pipe C. If desirable, a pipe may be connected in a similar manner to the vessel A, so as to remove any sediment collected in the latter. The water in this vessel is so pure, however, that but a small amount of sediment would ever be deposited in the same.

It will be seen that by the above-described apparatus the water is both purified and cooled, that the apparatus is simple and cheap, and that the accumulated sediment from the water may be readily removed at any time without the necessity of opening or removing the vessels.

I claim as my invention and desire to secure by Letters Patent—

The vessels A and A', connected by the tube $a$, having the inlet-pipe $b$ and outlet-pipe $d$, perforated partition E, and filtering media $x\ x\ x\ x$, all combined and arranged as herein described.

In testimony whereof I have signed my name to this specification in the presence of two subscribing witnesses.

LOUIS SCHARFF.

Witnesses:
CHARLES E. FOSTER,
JOHN WHITE.